United States Patent [19]

Miyake et al.

[11] Patent Number: 5,777,688
[45] Date of Patent: Jul. 7, 1998

[54] SIGNAL PROCESSOR

[75] Inventors: Jiro Miyake; Kazuki Ninomiya, both of Osaka; Miki Urano, Wakayama; Shintaro Tsubata; Tamotsu Nishiyama, both of Osaka, all of Japan

[73] Assignee: Matsushita Electric Industrial Co., Ltd., Osaka, Japan

[21] Appl. No.: 644,784

[22] Filed: May 10, 1996

[30] Foreign Application Priority Data

May 11, 1995 [JP] Japan .................... 7-112902

[51] Int. Cl.$^6$ .................. H04N 5/14; H04N 9/64
[52] U.S. Cl. .............. 348/571; 348/571; 364/750.5; 364/736.5; 364/768
[58] Field of Search ................... 348/553, 554, 348/555, 556, 557, 558, 571, 575; 364/750.5, 736.5, 768; H04N 5/14, 9/64

[56] References Cited

U.S. PATENT DOCUMENTS 4,482,916  11/1984  Acampora ..................... 358/27
4,489,393  12/1984  Kawahara et al. ............. 364/728

FOREIGN PATENT DOCUMENTS 58-162120   9/1983  Japan .
6-13843     1/1994  Japan .

OTHER PUBLICATIONS

IEEE Journal of Solid-State Circuits, "A 54-MHz CMOS Programmable Video Signal Processor for HDTV Applications", C. Joanblanq, et al. vol. 25, No. 3, pp. 730-734, Jun. 1990.

*Primary Examiner*—Tommy P. Chin
*Assistant Examiner*—Nhon T. Diep
*Attorney, Agent, or Firm*—McDermott, Will & Emery

[57] ABSTRACT

A plurality of signal processing elements are cascade-connected to form a signal processor having three signal paths. The signal processor is a small-sized device which can be shared by sum-of-products calculation and division. In each signal processing element, first and second shifters and an adder-subtracter are used for performing shift addition for multiplication of a variable by a constant which is a basis of the sum-of-products calculation. The adder-subtracter and a third shifter for shifting a result obtained by the adder-subtracter are used for performing subtraction and shifting for obtaining a partial quotient and a partial remainder of division. The partial quotient thus obtained is transferred to the signal processing element in the next stage through a flag holding circuit.

6 Claims, 15 Drawing Sheets

F I G. 5

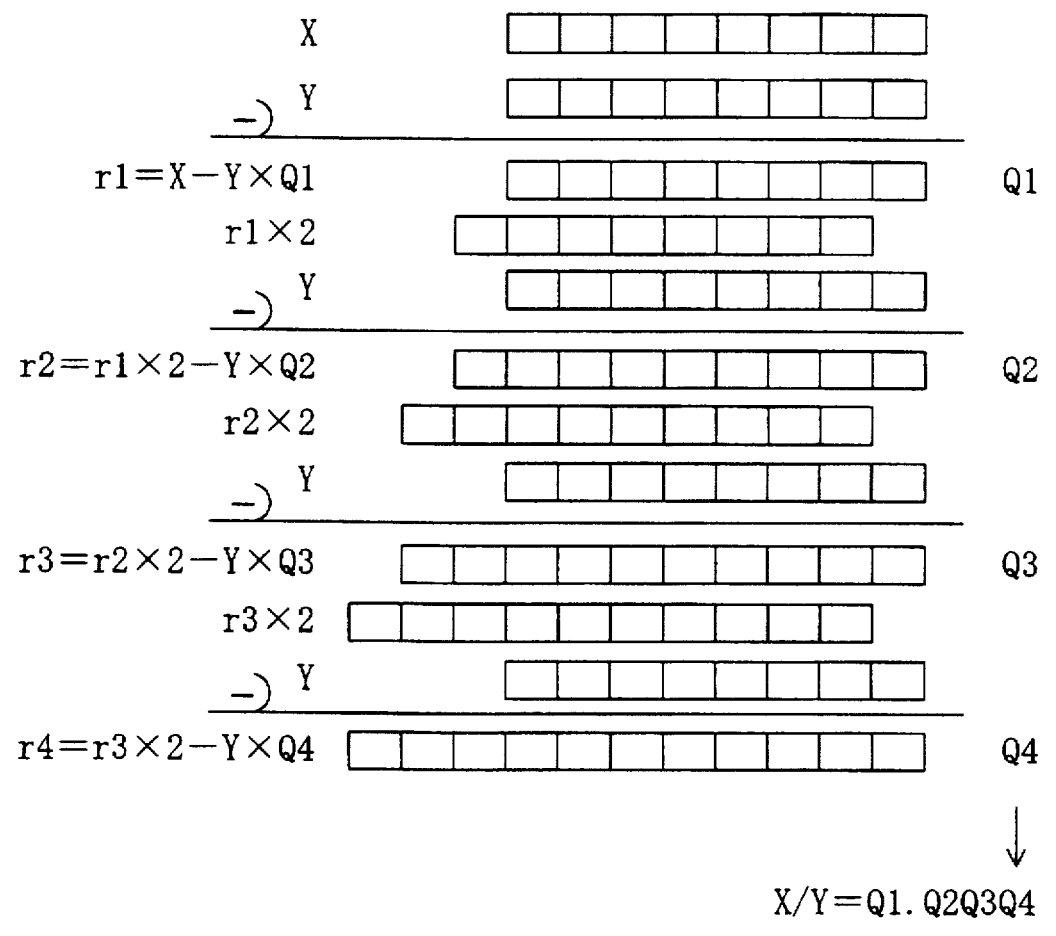

$r1 = X - Y \times Q1$     Q1
$r1 \times 2$
$r2 = r1 \times 2 - Y \times Q2$     Q2
$r2 \times 2$
$r3 = r2 \times 2 - Y \times Q3$     Q3
$r3 \times 2$
$r4 = r3 \times 2 - Y \times Q4$     Q4

$X/Y = Q1.Q2Q3Q4$

F I G. 6

|   | | X | 0 | 1 | 0 | 1 | 0 | 0 | 1 | 0 | | |
|---|---|---|---|---|---|---|---|---|---|---|---|---|
| −) | Y | | 0 | 0 | 1 | 1 | 0 | 0 | 1 | 0 | | |
| r1=X−Y | | | 0 | 0 | 1 | 0 | 0 | 0 | 0 | 0 | ≧0 | Q1=1 |
| r1×2 | | 0 | 0 | 1 | 0 | 0 | 0 | 0 | 0 | | | |
| −) | Y | | 0 | 0 | 1 | 1 | 0 | 0 | 1 | 0 | | |
| r2=r1×2−Y | | | 0 | 0 | 0 | 0 | 1 | 1 | 1 | 0 | ≧0 | Q2=1 |
| r2×2 | | 0 | 0 | 0 | 0 | 1 | 1 | 1 | 0 | | | |
| −) | Y | | 0 | 0 | 1 | 1 | 0 | 0 | 1 | 0 | | |
| r2×2−Y | | | 1 | 1 | 1 | 0 | 1 | 0 | 1 | 0 | <0 | Q3=0 |
| r3=r2×2 | | | 0 | 0 | 0 | 0 | 1 | 1 | 1 | 0 | | |
| r3×2 | | 0 | 0 | 0 | 0 | 1 | 1 | 1 | 0 | | | |
| −) | Y | | 0 | 0 | 1 | 1 | 0 | 0 | 1 | 0 | | |
| r4=r3×2−Y | | | 0 | 0 | 0 | 0 | 0 | 1 | 1 | 0 | ≧0 | Q4=1 |

↓

X/Y=1.101

F I G. 7
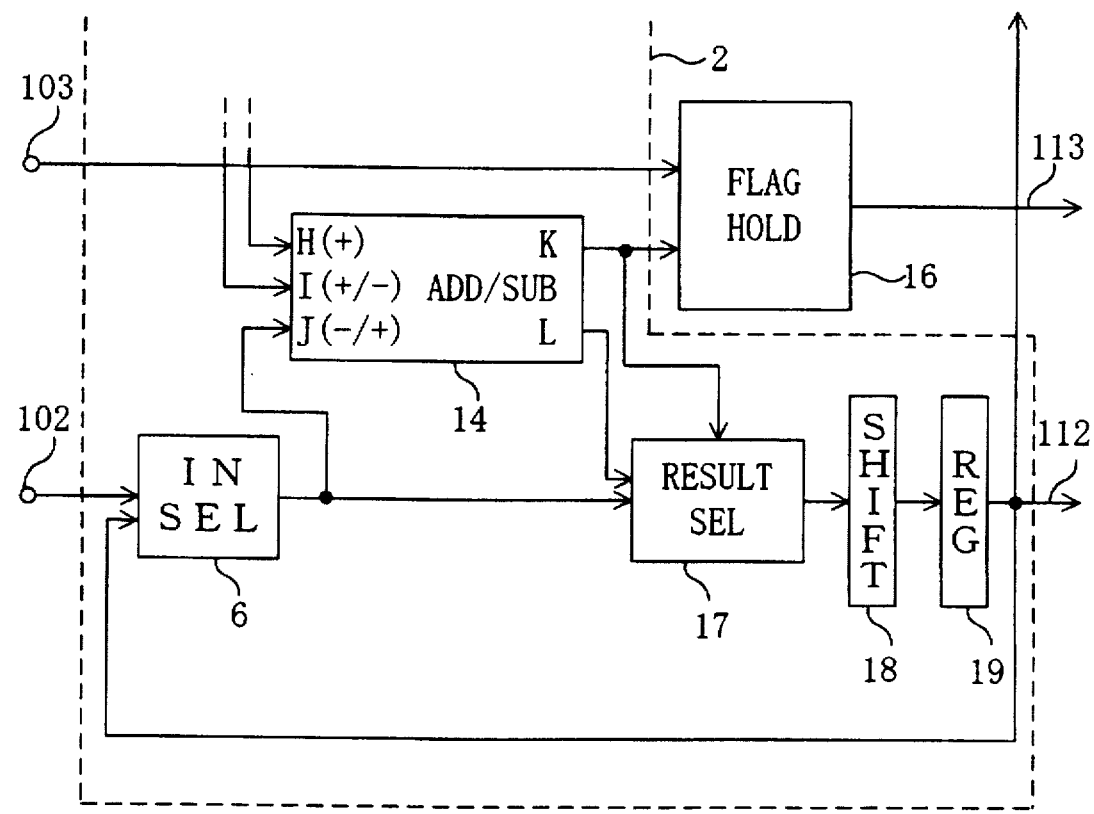

F I G. 12
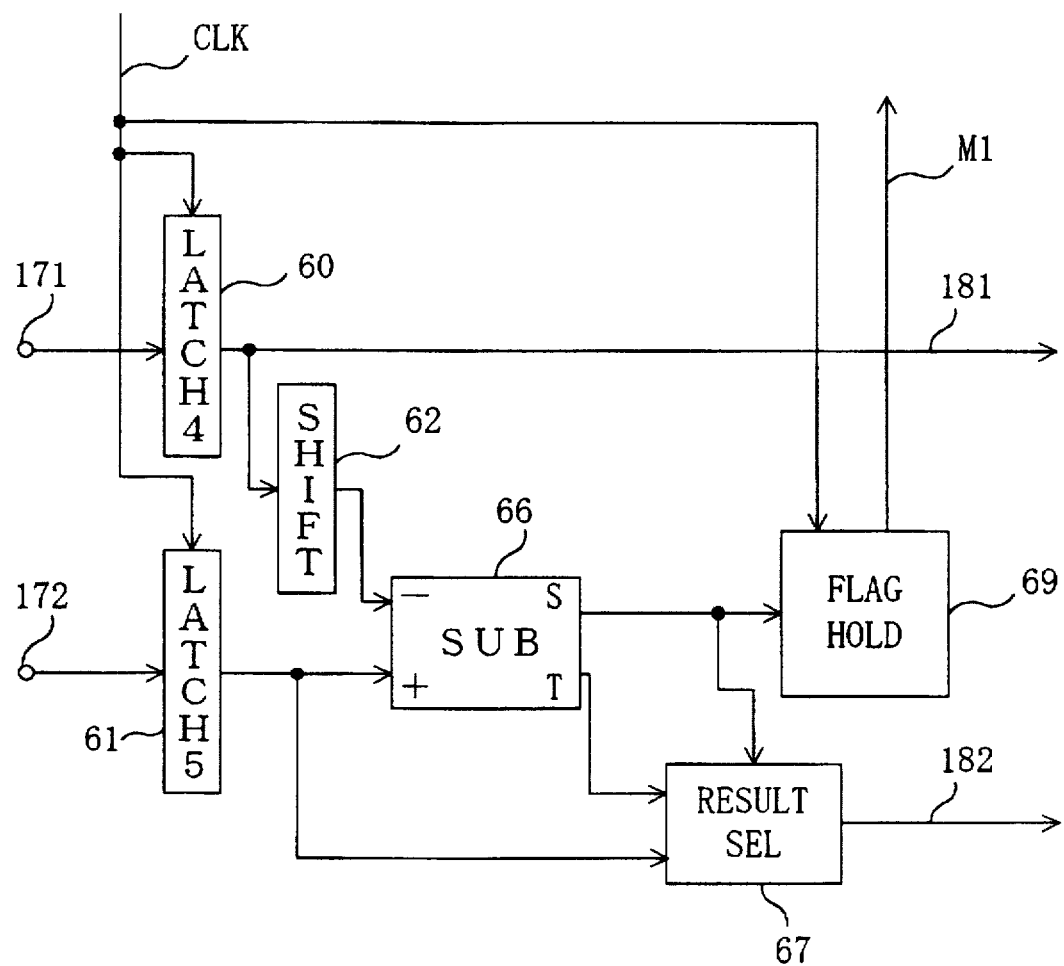

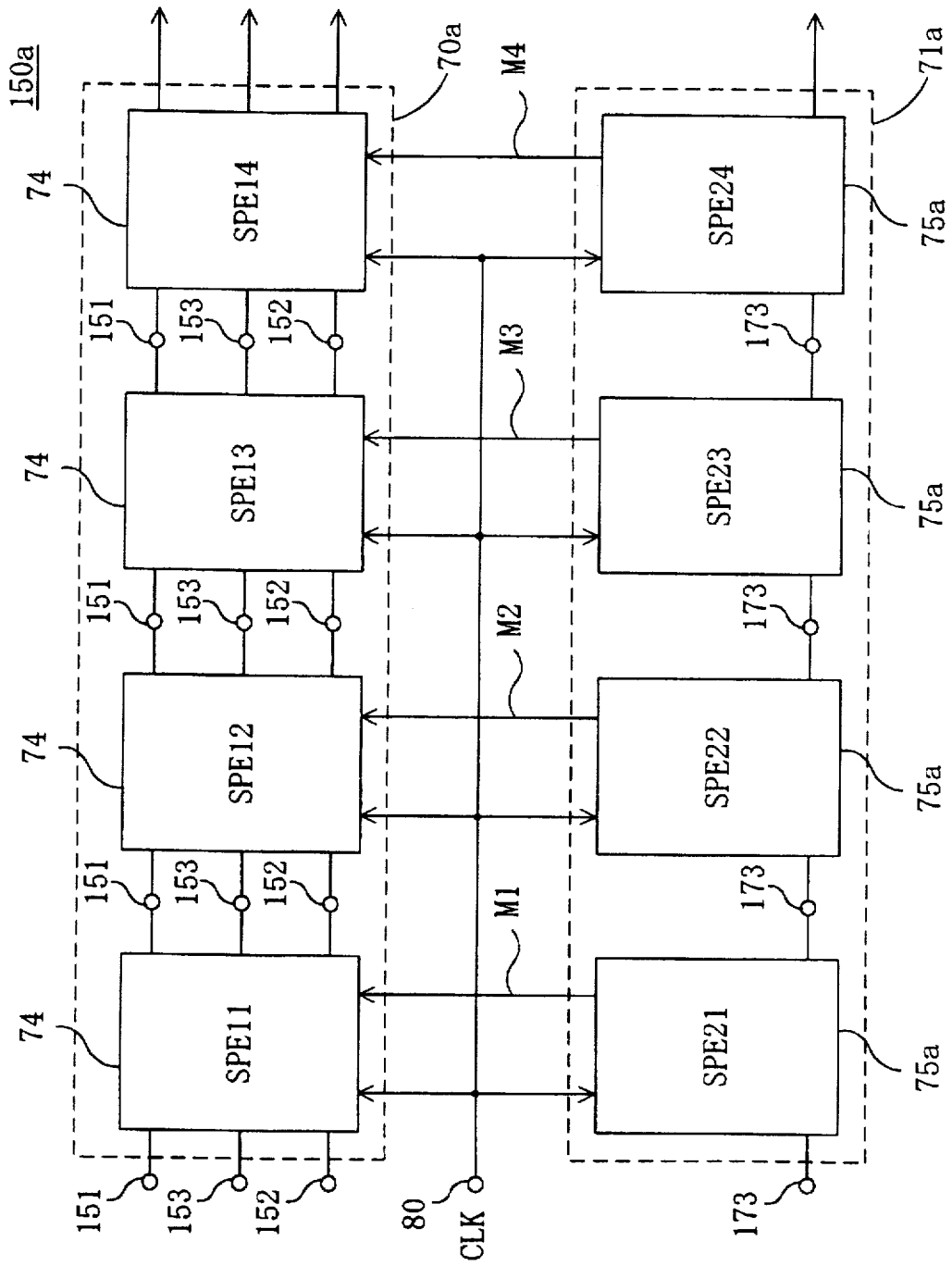
F I G. 13

F I G. 14
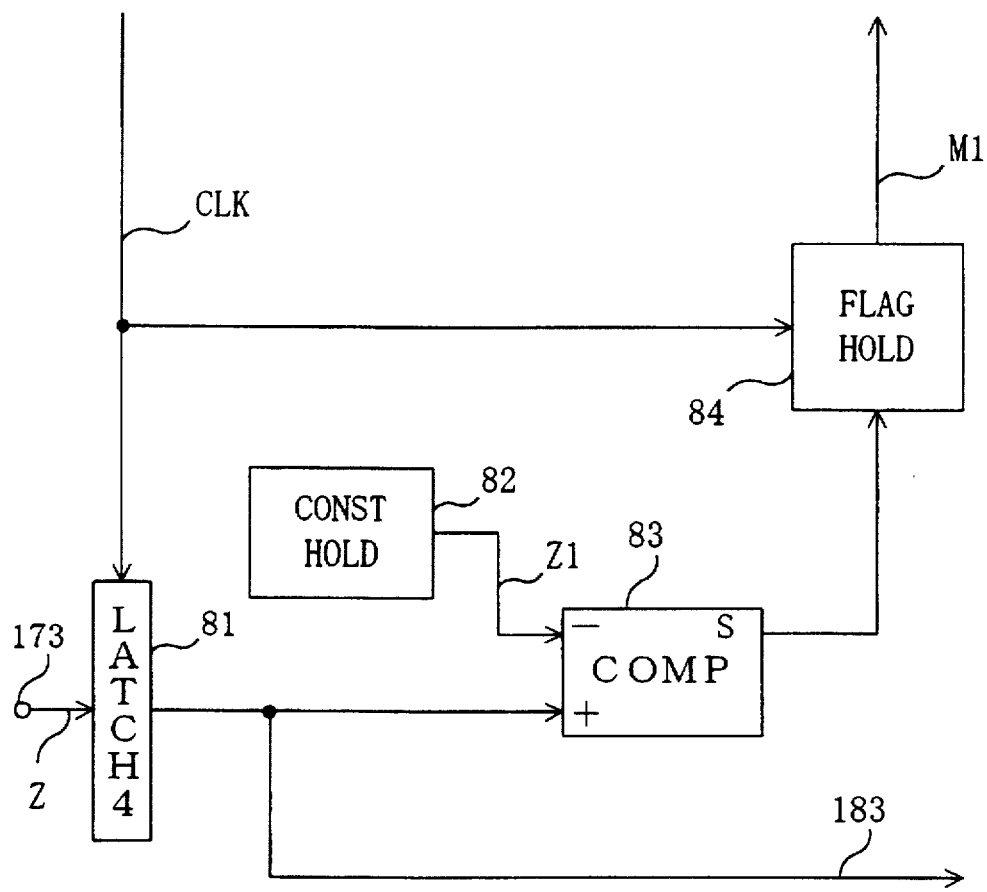

F I G. 15
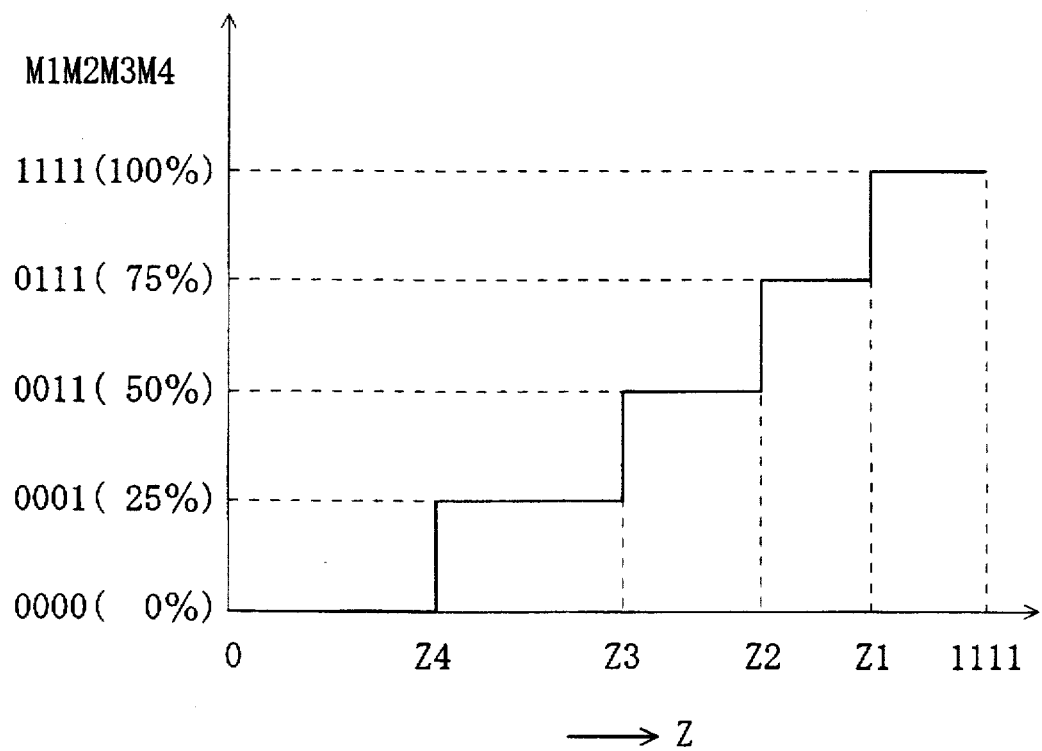

SIGNAL PROCESSOR

BACKGROUND OF THE INVENTION

The present invention relates to a signal processor for arithmetic operation processing of video signals, audio signals and the like.

New television systems such as an extended definition TV (EDTV) system, a high definition TV (HDTV) system and the like have been brought into practical use in addition to a conventional National Television System Committee (NTSC) system. It has been greatly desired that a flexible video signal processor which can be shared by processing algorithms of different TV systems is implemented. However, a conventional TV receiver has plural pieces of dedicated hardware to be compatible with different TV systems, and hardware switching from one TV system to another must be made depending on a TV signal received. This results in increasing the cost of TV receivers. Further, to be compatible with forthcoming TV systems and to deal with process algorithm modifications, new hardware must be developed which is time-consuming and expensive.

In a TV receiver, there are executed many arithmetic operations, such as a sum-of-products calculation for filtering a video signal, a subtraction for obtaining an inter-frame difference, and a subtraction for obtaining an intra-frame difference. The inter-frame difference is a difference between two pixels respectively belonging to separate frames. The intra-frame difference is a difference between two pixels in a frame and is called as an amount of edge. The inter-frame difference divided by the amount of edge gives an amount of image movement. A result of image-with-movement processing and a result of image-without-movement processing are mixed together in accordance with the amount of image movement.

A conventional sum-of-products calculating circuit is composed of a plurality of multiplication circuits and a plurality of adders. Each multiplication circuit has a complicated structure in which a lot of full adders are connected like a tree. Consequently, the sum-of-products calculating circuit is enlarged and the processing speed of the calculating circuit is lowered.

A conventional division circuit for calculating the amount of image movement has a ROM (Read Only Memory). A lot of results of division are stored in the ROM, an address related to the combination of a dividend (the inter-frame difference) and a divisor (the amount of edge) is given to the ROM, and the result of operation corresponding to the address is read from the ROM. The division circuit is enlarged because of the ROM.

A conventional mixing circuit is composed of two multiplication circuits, an adder and a subtracter. Each multiplication circuit has a complicated structure in which a lot of full adders are connected like a tree. If a result of image-with-movement processing, a result of image-without-movement processing and an amount of image movement are expressed by A, B and K respectively, a result of mixing, MX, is obtained by executing the following calculation:

$$MX = K \times A + (16-K) \times B$$

wherein the amount of image movement K is any of integers 0 to 16. The mixing circuit has the same problems as those of the sum-of-products calculating circuit due to the complicated multiplication circuits.

Each piece of dedicated hardware which is built in the conventional TV receiver is formed by the combination of dedicated circuit units including the sum-of-products calculating circuit, the division circuit and the mixing circuit above mentioned. As long as these dedicated circuit units are used, the flexible video signal processor described above cannot be implemented. Similarly, a flexible audio signal processor cannot be implemented.

SUMMARY OF THE INVENTION

It is an object of the present invention to provide a circuit unit for signal processing which can be shared among plural processing algorithms.

It is another object of the present invention to provide a signal processor with less circuitry.

In order to accomplish the above objects, the present invention implements a signal processor which can be shared among sum-of-products calculation and division by using neither a ROM nor a multiplication circuit having a complicated structure. More specifically, a first signal processor has a plurality of processing elements, the plurality of processing elements being connected in cascade so as to form a first path for transferring an input data signal of the first signal processor, and second and third paths each for transferring a data signal indicative of a processing result of the input data signal. Each of the plurality of processing elements comprises a first input disposed on the first path for providing a first data signal; a second input disposed on the second path for providing a second data signal; a third input disposed on the third path for providing a third data signal; a data holding circuit for holding the first data signal provided from the first input, and for providing the first data signal thus held; an arithmetic circuit for obtaining an operation result of addition-and-subtraction of the first data signal provided from the data holding circuit and the second data signal provided from the second input, for transferring a data signal which indicates the operation result thus obtained to the second path, and for providing a flag signal which indicates a sign of the operation result thus obtained; an output selecting circuit for transferring, to the first path, either one of the first data signal provided from the data holding circuit and the data signal provided from the arithmetic circuit; a flag holding circuit for merging the flag signal provided from the arithmetic circuit to the third data signal provided from the third input, for holding a merged flag signal thus obtained, and for transferring the merged flag signal thus held to the third path; and a processing control circuit for controlling respective operations of the data holding circuit, the arithmetic circuit, the output selecting circuit and the flag holding circuit. The arithmetic circuit comprises an input shifter for performing a specified amount of shift processing on the first data signal provided from the data holding circuit, and for providing a data signal which indicates a result of the shift processing thus performed; an adder-subtracter for executing an addition-subtraction operation of the data signal provided from the input shifter and another data signal, and for providing a data signal which indicates an operation result of the addition-subtraction operation thus executed; a result shifter for performing a specified amount of shift processing on the data signal provided from the adder-subtracter, and for providing a data signal which indicates a result of the shift processing thus performed; a result register for holding the data signal provided from the result shifter, and for providing the data signal thus held; and an input selecting circuit for providing, to the adder-subtracter, either one of the second data signal provided from the second input and the data signal provided from the result register.

According to the first signal processor, the input shifter and the adder-subtracter are used so that the sum-ofproducts calculation is executed. If an input data signal is transferred through the first path and a data signal which indicates an intermediate result of the sum-of-products calculation is transferred through the second path, a final result of the sum-of-products calculation can be obtained by some of the processing elements. If a bypass is provided from the second path to the first path by the output selecting circuit and a data signal which indicates the final result of the sum-of-products calculation is transferred to the first path, the residual processing elements can execute other processing. Furthermore, the first signal processor can execute division by using the adder-subtracter, the flag holding circuit, and the result shifter. In this case, a divisor signal is given to the first path and a dividend signal is given to the second path. The divisor signal is transferred through the first path. A partial remainder signal is transferred through the second path. A partial quotient signal is transferred through the third path. A signal which represents a final result of the division, i.e., a quotient is obtained by the flag holding circuit of the processing element in the final stage.

Furthermore, the present invention implements a signal processor for executing mixing processing without using a multiplication circuit having a complicated structure. More specifically, a second signal processor has a plurality of processing elements, the plurality of processing elements being connected in cascade so as to form first and second paths for transferring input data signals of the second signal processor, and a third path for transferring a data signal indicative of a processing result of the input data signals. Each of the plurality of processing elements comprises a first input disposed on the first path for providing a first data signal; a second input disposed on the second path for providing a second data signal; a third input disposed on the third path for providing a third data signal; a first latch for holding the first data signal provided from the first input, for transferring the first data signal thus held to the first path, and for providing the first data signal thus held; a second latch for holding the data signal provided from the second input, for transferring the second data signal thus held to the second path, and for providing the second data signal thus held; a third latch for holding the third data signal provided from the third input, and for providing the third data signal thus held; a selecting circuit for selecting either one of the first data signal provided from the first latch and the second data signal provided from the second latch in response to a given selection signal, and for providing the data signal thus selected; an adder for obtaining a sum of the data signal provided from the selecting circuit and the third data signal provided from the third latch, and for providing a data signal which indicates the sum thus obtained; and a shifter for performing a specified amount of shift processing on the data signal provided from the adder, and for transferring a data signal which indicates a result of the shift processing thus performed to the third path.

According to the second signal processor, two data signals which should be mixed are transferred through the first and second paths, and a data signal which indicates an intermediate result of the mixing processing is transferred through the third path. A signal which indicates a final result of the mixing processing is obtained by the shifter of the processing element in the final stage.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a chart showing another algorithm for division;

FIG. 6 is a chart showing a specific example of division;

FIG. 7 is a block diagram showing a modification of the signal processing element in FIG. 2;

FIG. 12 is a block diagram showing the internal structure of a signal processing element in a lower element array in FIG. 10;

FIG. 13 is a block diagram showing yet another example of the structure of a signal processor according to the present invention;

FIG. 14 is a block diagram showing the internal structure of a signal processing element in a lower element array in FIG. 13; and FIG. 15 is a chart showing the operation of the lower element array in FIG. 13.

DETAILED DESCRIPTION OF THE INVENTION

Preferred examples of a signal processor according to the present invention will be described below with reference to the drawings.

Figure 1:
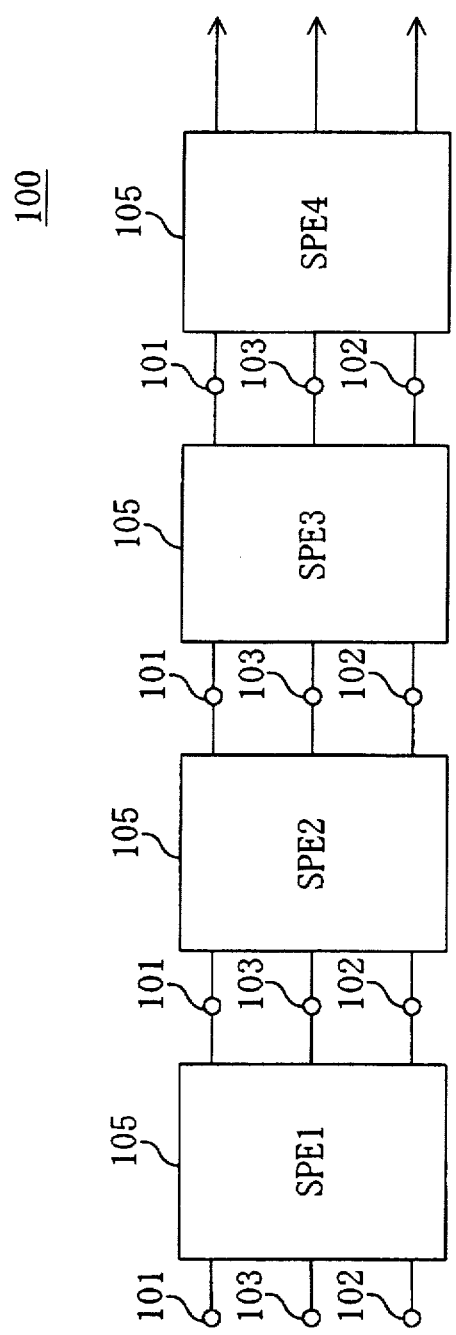
FIG. 1 is a block diagram showing an example of the structure of a signal processor according to the present invention.

FIG. 1 shows an example of the structure of a signal processor according to the present invention. In FIG. 1, a signal processor 100 comprises four signal processing elements (SPEs) 105 which are cascade-connected to each other. The signal processing elements 105 in first to fourth stages will be hereinafter referred to as SPE1, SPE2, SPE3 and SPE4. Each SPE has a first input 101, a second input 102 and a third input 103.

Figure 2:
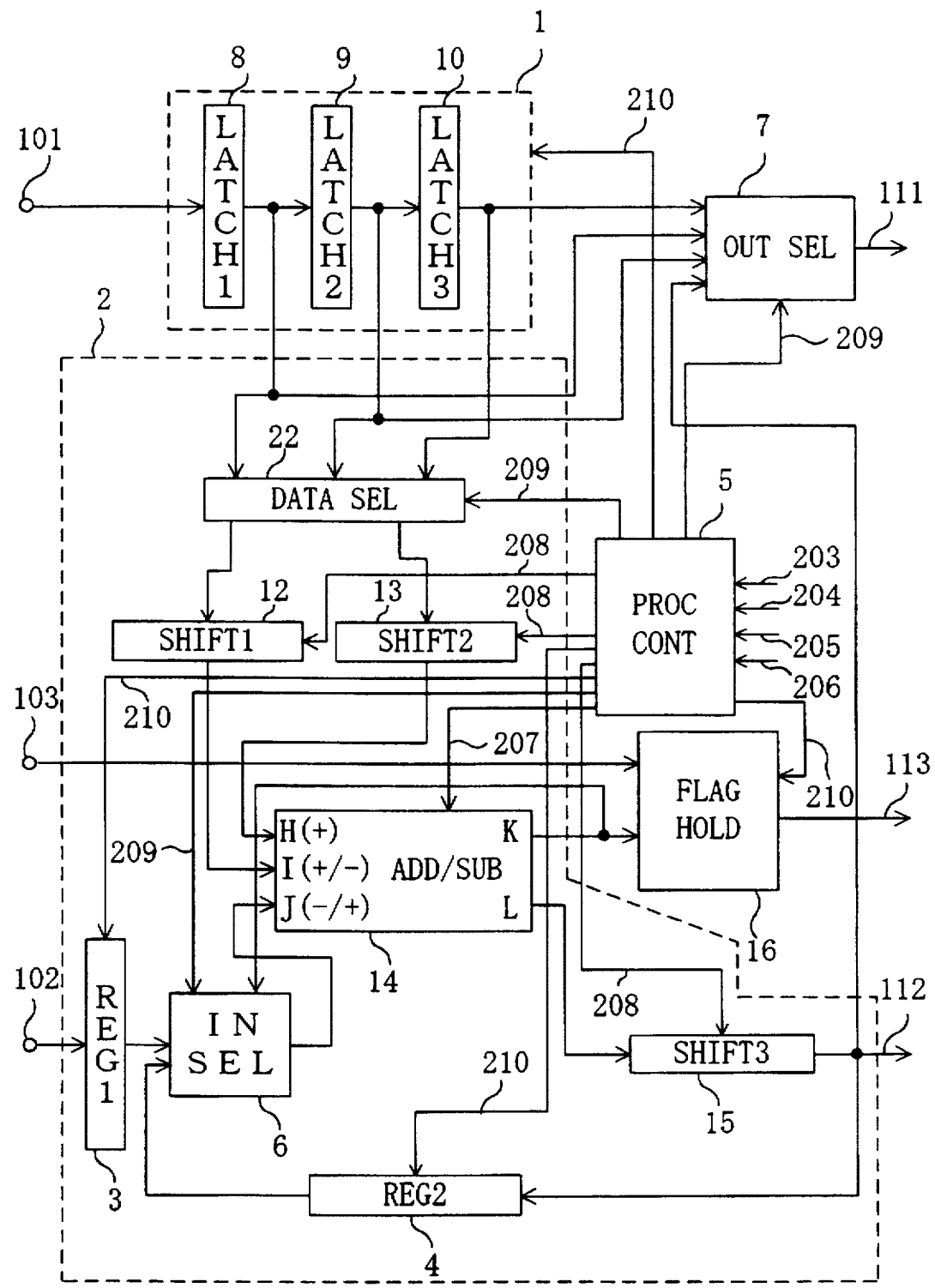
FIG. 2 is a block diagram showing the internal structure of a signal processing element in FIG. 1.

FIG. 2 shows the internal structure of the SPE1 in FIG. 1. The SPE1 comprises a data holding circuit 1, an arithmetic circuit 2, an output selecting circuit 7, a flag holding circuit 16, and a processing control circuit 5. The SPE2, SPE 3 and SPE4 have the same internal structures as in FIG. 2.

The data holding circuit 1 comprises first, second and third latches 8, 9 and 10 for holding three data signals sent through the first input 101. The first, second and third latches 8, 9 and 10 are cascade-connected to each other so as to form a shift register.

The arithmetic circuit 2 comprises a first register (input register) 3 for holding a data signal sent through the second input 102, a data selecting circuit 22 for selecting at least one data signal from the three data signals held by the data holding circuit 1, first and second shifters (input shifters) 12 and 13 for performing a specified amount of shift processing on the selected data signals, an adder-subtracter 14 for executing addition-subtraction of a data signal which indicates the result of the shift processing performed by the first and second shifters 12 and 13, and another data signal, a third shifter (result shifter) 15 for performing a specified amount of shift processing on a data signal which indicates the result of operation, L, obtained by the adder-subtracter 14, a second register (result register) 4 for holding a data signal which indicates the result of the shift processing performed by the third shifter 15, and an input selecting circuit 6 for sending, to the adder-subtracter 14, either a data signal output from the first register 3 or a data signal output from the second register 4. When a data signal which indicates the result of the shift processing performed by the second shifter 13, a data signal which indicates the result of the shift processing performed by the first shifter 12 and a data signal sent from the input selecting circuit 6 are expressed by H, I and J respectively, the adder-subtracter 14 executes addition H+I, addition I+J, subtraction I−J or subtraction J−I. In the case where the subtraction is executed, the adder-subtracter 14 sends a flag signal K which indicates the sign of the result of subtraction together with a data signal which indicates the result of subtraction L. In the following description, if L<0, then K=0, and if L≧0, then K=1. The adder-subtracter 14 also has the function of sending the data signal output from the input selecting circuit 6 to the third shifter 15. In this case, L=J is realized.

The output selecting circuit 7 selects one of the three data signals held by the data holding circuit 1 and a data signal output from the third shifter 15, and sends the selected signal to the first input 101 of the SPE2 through a first output 111. The data signal output from the third shifter 15 is sent to a second input 102 of the SPE2 through a second output 112. The flag holding circuit 16 merges the flag signal K sent from the adder-subtracter 14 to a flag signal sent through the third input 103 and holds a merged flag signal. The merged flag signal is sent to a third input 103 of the SPE2 through a third output 113. The processing control circuit 5 controls respective operations of the data holding circuit 1, the arithmetic circuit 2, the output selecting circuit 7 and the flag holding circuit 16.

Figure 3:
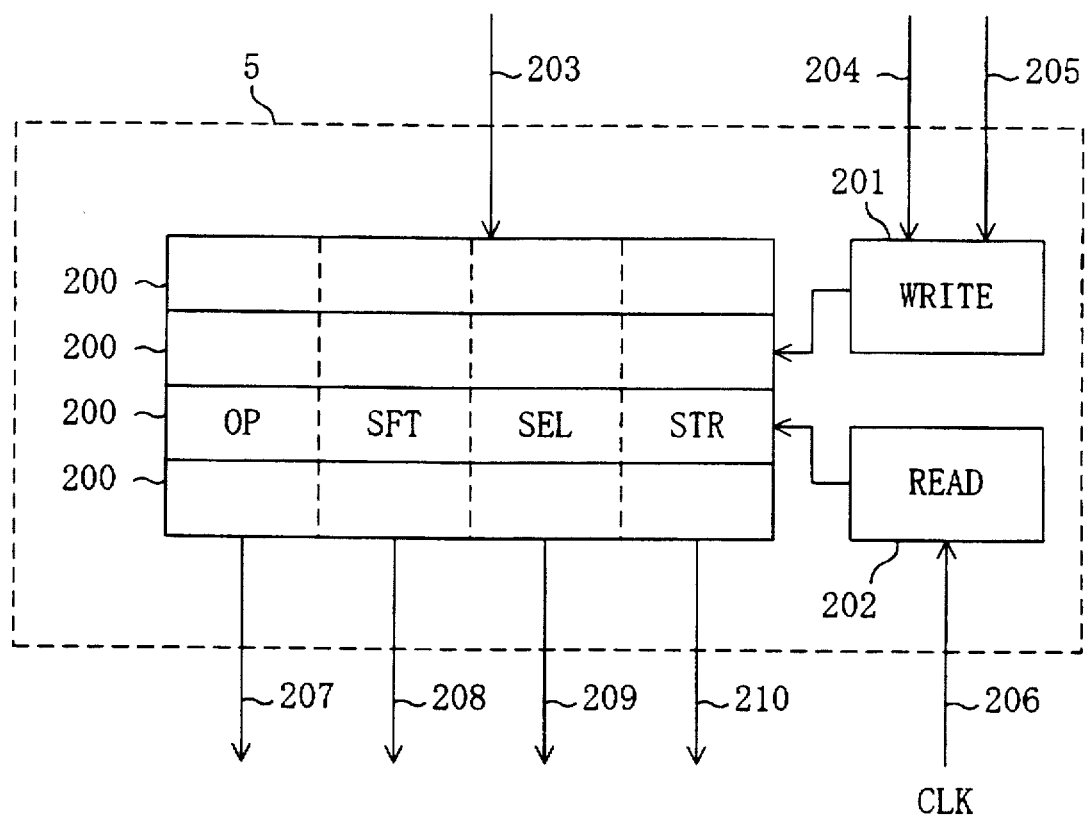
FIG. 3 is a block diagram showing the internal structure of a processing control circuit in FIG. 2.

FIG. 3 shows the internal structure of the processing control circuit 5. The processing control circuit 5 comprises four control registers 200 for storing control information, a write control circuit 201 for writing the control information to the control registers 200, and a read control circuit 202 for reading the control information from the control registers 200. The write control circuit 201 receives an address for specifying one of the control registers 200 through an address bus 204, data which indicates the control information to be written through a data bus 203, and a write control signal through a signal line 205. Each of the control registers 200 has an operation field OP, a shift field SFT, a selection field SEL, and a store field STR. The operation field OP stores information for specifying the operation rules of the adder-subtracter 14. The shift field SFT stores the amounts of shift of the first, second and third shifters 12, 13 and 15. The selection field SEL stores information for controlling the input selecting circuit 6, the output selecting circuit 7 and the data selecting circuit 22. The store field STR stores information for controlling the data holding circuit 1, the first register 3, the second register 4 and the flag holding circuit 16. The read control circuit 202 inputs a clock signal CLK through a signal line 206. The read control circuit 202 reads the control information from the control registers 200 cyclically in synchronization with the input clock signal CLK. The contents of each field of the control registers 200 which are read out are output as control signals 207, 208, 209 and 210.

The signal processor 100 having the above structure can execute sum-of-products calculation and division. First of all, the operation of the sum-of-products calculation will be described. The basis of sum-of-products calculation is multiplication of a data signal Y1 by a constant coefficient A1. By way of example, $A1 = 11/16 = 1/2 + 1/8 + 1/16$ will be described below. The data signal Y1 is sent from the first input 101 to a first latch 8 of the SPE1. In a first cycle, the data selecting circuit 22 of the SPE1 selects the data signal Y1 held by the first latch 8. The processing control circuit 5 issues commands to the first and second shifters 12 and 13 so as to perform right shifts by 1 bit and 3 bits, respectively The adder-subtracter 14 adds the outputs of the first and second shifters 12 and 13. Consequently, the result of addition $L = Y1 \times (1/2 + 1/8)$ is obtained. A data signal which indicates the result of addition passes through the third shifter 15 and is stored in the second register 4. In a second cycle, a data signal Y1 of the first latch 8 of the SPE1 is transferred to the second latch 9. The data selecting circuit 22 selects the data signal Y1 held by the second latch 9. The processing control circuit 5 issues a command to the first shifter 12 so as to perform right shift by 4 bits. The input selecting circuit 6 selects a data signal sent from the second register 4. The adder-subtracter 14 adds a data signal sent from the first shifter 12 to a data signal sent from the input selecting circuit 6. Consequently, the result of multiplication $Y1 \times A1 = Y1 \times (1/2 + 1/8 + 1/16)$ is obtained.

In the above example, the SPE1 executes multiplication Y1×A1 in 2 cycles. The SPE2 may perform the processing for the second cycle. In this case, the data signal Y1 held by the first latch 8 of the SPE1 and the data signal $Y1 \times (1/2 + 1/8)$ held by the third shifter 15 of the SPE1 are respectively stored in a first latch 8 and a first register 3 of the SPE2 in the second cycle. In the SPE2, the data signal Y1 of the first latch 8 is shifted right by 4 bits and sent to the adder-subtracter 14 through the data selecting circuit 22 and the first shifter 12. The data signal $Y1 \times (1/2 + 1/8)$ of the first register 3 is sent to the adder-subtracter 14 through the input selecting circuit 6. The adder-subtracter 14 obtains the result of multiplication $Y1 \times (1/2 + 1/8 + 1/16)$ by the execution of addition. Thus, the multiplication Y1×A1 can be executed by 2 SPEs. In addition, when the processing for the second cycle is performed by the SPE2, the processing for a new data signal can be executed by the SPE1 at the same time. By adopting such pipeline processing, the signal processing ability can be enhanced.

According to the signal processor 100, the multiplication of another data signal Y2 by another constant coefficient A2 is executed in the same manner and the result of the sum-of-products calculation Y1×A1+Y2×A2 is obtained.

Figure 4:
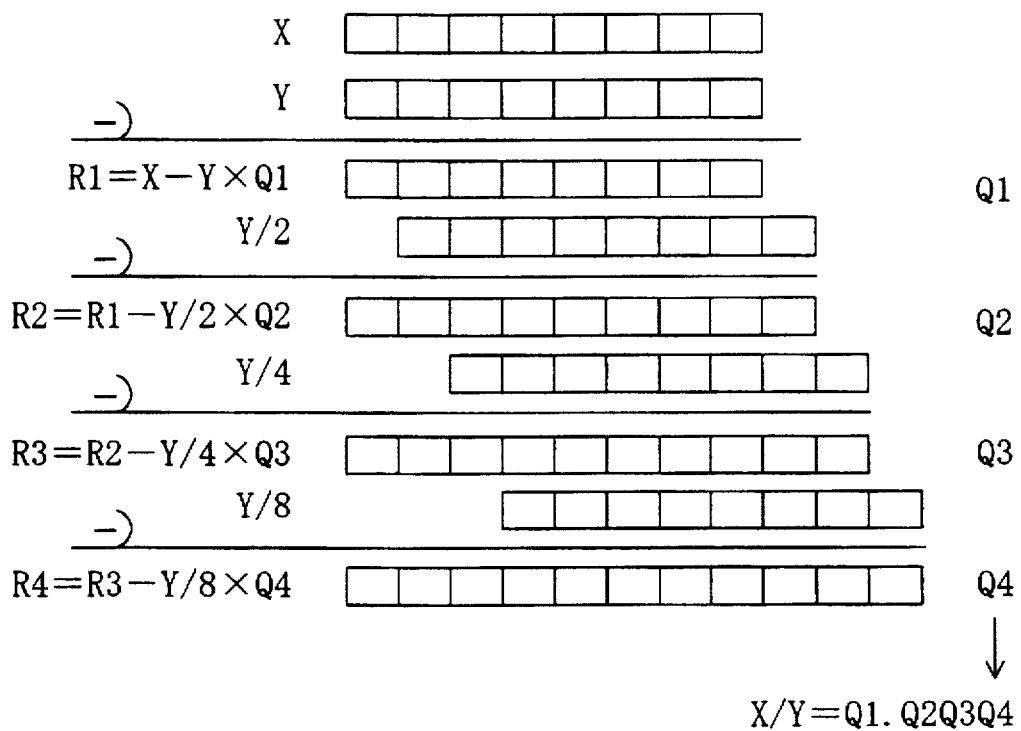
FIG. 4 is a chart showing an algorithm for division.

The execution of division X/Y will be described below. FIG. 4 shows an algorithm for the division X/Y. A dividend X and a divisor Y are 8-bit integers. First of all, a 1-bit partial quotient Q1 and a partial remainder R1=X−Y×Q1 are obtained from the dividend X and the divisor Y. If X≧Y, then Q1=1 and R1=X−Y. If X<Y, then Q1=0 and R1=X. Then, the divisor Y is shifted right by 1 bit and the result Y/2 thus obtained acts as a new divisor. Consequently, a 1-bit partial quotient Q2 and a partial remainder R2=R1−Y/2×Q2 are obtained from the partial remainder R1 and the divisor Y/2. If R1≧Y/2, then Q2=1 and R2=R1−Y/2. If R1<Y/2, then Q2=0 and R2=R1. Thereafter, the divisor Y/2 is shifted right by 1 bit and the result Y/4 thus obtained acts as a new divisor. Consequently, a 1-bit partial quotient Q3 and a partial remainder R3=R2−Y/4×Q3 are obtained from the partial remainder R2 and the divisor Y/4. If R2≧Y/4, then Q3=1 and R3=R2−Y/4. If R2<Y/4, then Q3=0 and R3=R2. Next, the divisor Y/4 is shifted right by 1 bit and the result Y/8 thus obtained acts as a new divisor. Thus, a 1-bit partial quotient Q4 and a partial remainder R4=R3−Y/8×Q4 are obtained from the partial remainder R3 and the divisor Y/8. If R3≧Y/8, then Q4=1 and R4=R3−Y/8. If R3<Y/8, then Q4=0 and R4=R3. A quotient X/Y to be obtained is a connection of the 1-bit partial quotients Q1, Q2, Q3 and Q4. A 4-bit quotient Q1Q2Q3Q4 thus obtained has an integer portion Q1 and a fraction portion Q2Q3Q4. A quotient having an optional bit length can be obtained in the same manner.

FIG. 5 shows another algorithm for the division X/Y. First of all, a 1-bit partial quotient Q1 and a partial remainder r1=X−Y×Q1 are obtained from a dividend X and a divisor Y. If X≧Y, then Q1=1 and r1=X−Y. If X<Y, then Q1=0 and r1=X. Then, the partial remainder r1 is shifted left by 1 bit and the result r1×2 thus obtained acts as a new dividend. Consequently, a 1-bit partial quotient Q2 and a partial remainder r2=r1×2−Y×Q2 are obtained from the dividend r1×2 and the divisor Y. If r1×2≧Y, then Q2=1 and r2=r1×2−Y. If r1×2<Y, then Q2=0 and r2=r1×2. Thereafter, the partial remainder r2 is shifted left by 1 bit and the result r2×2 thus obtained acts as a new dividend. Consequently, a 1-bit partial quotient Q3 and a partial remainder r3=r2×2−Y×Q3 are obtained from the dividend r2×2 and the divisor Y. If r2×2≧Y, then Q3=1 and r3=r2×2−Y. If r2×2<Y, then Q3=0 and r3=r2×2. Next, the dividend r3 is shifted left by 1 bit and the result r3×2 thus obtained acts as a new dividend. Consequently, a 1-bit partial quotient Q4 and a partial remainder r4=r3×2−Y×Q4 are obtained from the dividend r3×2 and the divisor Y. If r3×2≧Y, then Q4=1 and r4=r3×2−Y. If r3×2<Y, then Q4=0 and r4=r3×2. A quotient X/Y to be obtained is a connection of the 1-bit partial quotients Q1, Q2, Q3 and Q4. A 4-bit quotient Q1Q2Q3Q4 thus obtained has an integer portion Q1 and a fraction portion Q2Q3Q4. A quotient having an optional bit length can be obtained in the same manner.

FIG. 6 shows a specific example of the division X/Y according to the algorithm shown in FIG. 5. In this example, a 4-bit quotient X/Y is obtained from a dividend X=01010010 and a divisor Y=00110010. First of all, the subtraction X−Y is executed. Since the result of the subtraction is positive, a partial quotient Q1 is equal to 1 and a partial remainder r1 is equal to X−Y. After the partial remainder r1 is shifted left by 1 bit so that r1×2 is obtained, the subtraction r1×2−Y is executed. Since the result of the subtraction is positive, a partial quotient Q2 is equal to 1 and a partial remainder r2 is equal to r1×2−Y. After the partial remainder r2 is shifted left by 1 bit so that r2×2 is obtained, the subtraction r2×2−Y is executed. Since the result of the subtraction is negative, a partial quotient Q3 is equal to 0 and a partial remainder r3 is equal to r2×2. In this point of time, the result of the subtraction, i.e., r2×2−Y is discarded and r2×2 which has been obtained is employed as a partial remainder r3. After the partial remainder r3 is shifted left by 1 bit so that r3×2 is obtained, the subtraction r3×2−Y is executed. Since the result of the subtraction is positive, a partial quotient Q4 is equal to 1 and a partial remainder r4 is equal to r3×2−Y. Thus, the 4-bit quotient Q1Q2Q3Q4 is obtained. In other words, the quotient X/Y is 1.101.

The signal processor 100 employs the division algorithm shown in FIG. 5. It is assumed that a divisor signal Y is held by the first latch 8 of the SPE1 and a dividend signal X is held by the first register 3 of the SPE1. In a first cycle, the data selecting circuit 22 of the SPE1 selects the divisor signal Y held by the first latch 8. The first shifter 12 sends the divisor signal Y to the adder-subtracter 14. The input selecting circuit 6 sends the dividend signal X to the adder-subtracter 14. The adder-subtracter 14 executes the subtraction X−Y, and sends a data signal which indicates the result of subtraction L=X−Y and a flag signal K which indicates the sign of the result of the subtraction. The flag signal K indicates a 1-bit partial quotient Q1 of the division X/Y and is held by the flag holding circuit 16. The data signal which indicates the result of subtraction X−Y passes through the third shifter 15 and is stored in the second register 4. In a second cycle, the divisor signal Y of the first latch 8 of the SPE1 is transferred to the second latch 9. The input selecting circuit 6 selects a data signal X−Y sent from the second register 4 if the flag signal K obtained in the first cycle is 1, and selects a data signal X sent from the first register 3 if the flag signal K is 0, and sends the selected data signal to the adder-subtracter 14. The adder-subtracter 14 outputs the data signal (X−Y or X) sent from the input selecting circuit 6. Accordingly, the output data signal of the adder-subtracter 14 indicates the partial remainder r1 of the division X/Y. The third shifter 15 shifts a data signal r1 sent from the adder-subtracter 14 left by 1 bit. As a result, a new dividend signal r1×2 is sent to the second input 102 of the SPE2. The flag holding circuit 16 sends a flag signal which indicates the partial quotient Q1 to the third input 103 of the SPE2. The output selecting circuit 7 sends a divisor signal Y output from the second latch 9 to the first input 101 of the SPE2. Accordingly, the divisor signal Y is held by the first latch 8 of the SPE2, and a new dividend signal r1×2 is held by the first register 3 of the SPE2. In third and fourth cycles, the SPE2 performs the same operation as that of the SPE1 in the first and second cycles so that a 1-bit partial quotient Q2 of the division X/Y and a new dividend signal r2×2 are obtained. A flag holding circuit 16 of the SPE2 sends a 2-bit merged partial quotient Q1Q2 to the SPE3. By the same operation, a signal which indicates a 4-bit quotient X/Y= Q1Q2Q3Q4 is output from a flag holding circuit 16 of the SPE4.

As described above, the signal processor 100 can execute sum-of-products calculation and division by using neither a ROM nor a multiplication circuit having a complicated structure. As a matter of course, each SPE of the signal processor 100 can execute single addition and single subtraction.

FIG. 7 shows a modification of the SPE in FIG. 2. In a SPE 105a shown in FIG. 7, a data signal which indicates a 1-bit partial quotient Q1 of division X/Y and a new dividend signal r1×2 can be obtained in one cycle. In the SPE 105a shown in FIG. 7, the first register 3, the second register 4 and the third shifter 15 of the SPE shown in FIG. 2 are removed and a result selecting circuit 17, a result shifter 18 and a result register 19 are added. The result selecting circuit 17 selects a data signal which indicates the result of subtraction L obtained by an adder-subtracter 14 if a flag signal K obtained by the adder-subtracter 14 is 1, selects a data signal sent from an input selecting circuit 6 if the flag signal K is 0, and sends the selected data signal to the result shifter 18. The result shifter 18 performs a specified amount of shift processing on the data signal sent from the result selecting circuit 17. The result register 19 holds a data signal which indicates the result of shift processing performed by the result shifter 18, and sends the held data signal to the input selecting circuit 6, an output selecting circuit 7 and a second output 112. The input selecting circuit 6 outputs, to the adder-subtracter 14 and the result selecting circuit 17, either a data signal sent through a second input 102 or a data signal sent from the result register 19.

According to the SPE 105a shown in FIG. 7, when the adder-subtracter 14 outputs a data signal which indicates the result of subtraction L=X−Y and a flag signal K which indicates the sign of the result of subtraction, a data signal X-Y which indicates the result of the subtraction is selected by the result selecting circuit 17 if the flag signal K is 1, and a data signal X sent from the input selecting circuit 6 is selected by the result selecting circuit 17 if the flag signal K is 0. In other words, the data signal sent from the result selecting circuit 17 to the result shifter 18 indicates a partial remainder r1 of division X/Y. The result shifter 18 shifts a partial remainder signal r1 sent from the result selecting circuit 17 left by 1 bit. As a result, a new dividend signal r1×2 is held by the result register 19. The flag signal K indicates a 1-bit partial quotient Q1 of the division X/Y and is held by a flag holding circuit 16. According to the SPE 105a shown in FIG. 7 described above, the signal which indicates the 1-bit partial quotient Q1 of the division X/Y and the new dividend signal r1×2 are obtained in one cycle. If a signal path provided from the result register 19 to the input selecting circuit 6 is utilized, the subtraction processing for obtaining the next 1-bit partial quotient Q2 can be executed by the same adder-subtracter 14 which is used for obtaining the 1-bit partial quotient Q1.

Figure 8:
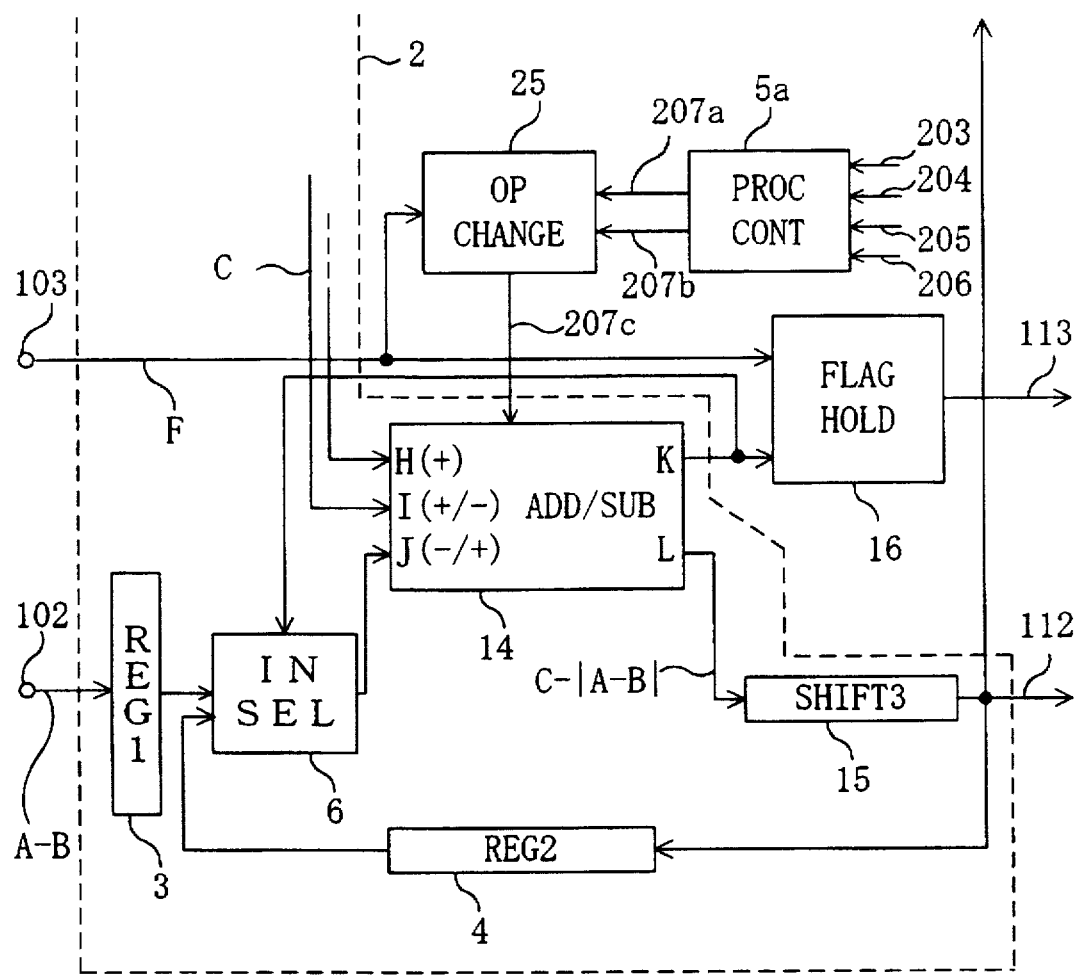
FIG. 8 is a block diagram showing another modification of the signal processing element in FIG. 2.

FIG. 8 shows another modification of the SPE in FIG. 2. A SPE 105b shown in FIG. 8 includes a structure in which the processing for obtaining an absolute value is executed. In the SPE 105b, an operation change control circuit 25 is provided between a processing control circuit 5a and an adder-subtracter 14. The processing control circuit 5a outputs control signals 207a and 207b for the adder-subtracter 14. The control signal 207a has a command for addition I+J or a command for subtraction I-J. The control signal 207b indicates a command for obtaining an absolute value. The operation change control circuit 25 outputs a control signal 207c to the adder-subtracter 14 so as to send a command for subtraction I-J if the operation change control circuit 25 receives the command for addition I+J and the command for obtaining an absolute value from the processing control circuit 5a and inputs a flag signal F which indicates the negative sign through a third input 103. The operation change control circuit 25 outputs the control signal 207c to the adder-subtracter 14 so as to send a command for addition I+J if the operation change control circuit 25 receives the command for subtraction I-J and the command for obtaining an absolute value from the processing control circuit 5a and inputs the flag signal F which indicates the negative sign through the third input 103. Furthermore, the operation change control circuit 25 outputs the command for addition or subtraction sent from the processing control circuit 5a to the adder-subtracter 14 if the operation change control circuit 25 inputs a flag signal F which indicates the positive sign through the third input 103.

For example, a first register 3 holds a data signal which indicates a difference A-B sent through a second input 102. The flag signal F sent through the third input 103 indicates the sign of the difference A-B. It is assumed that if A-B<0, then F=0, and if A-B≧0, then F=1. The data signal which indicates the difference A-B is sent as a J input to the adder-subtracter 14 through an input selecting circuit 6. A data signal C is sent as an I input to the adder-subtracter 14.

If A-B<0, i.e., F=0, then the adder-subtracter 14 executes the addition I+J when the processing control circuit 5a sends the command for subtraction I-J and the command for obtaining an absolute value. The result of addition L is expressed as follows.

$$L=I+J=C+(A-B)=C-|A-B|$$

If A-B≧0, i.e., F=1, then the adder-subtracter 14 executes the subtraction I-J when the processing control circuit 5a sends the command for subtraction I-J and the command for obtaining an absolute value. The result of subtraction L is expressed as follows.

$$L=I-J=C-(A-B)=C-|A-B|$$

In other words, the operation for subtracting the absolute value of the difference A-B from a value C is executed by the adder-subtracter 14 irrespective of the flag signal F. If A-B<0, i.e., F=0, then the adder-subtracter 14 executes the subtraction I-J when the processing control circuit 5a sends the command for addition I+J and the command for obtaining an absolute value. The result of subtraction L is expressed as follows.

$$L=I-J=C-(A-B)=C+|A-B|$$

If A-B≧0, i.e., F=1, then the adder-subtracter 14 executes the addition I+J when the processing control circuit 5a sends the command for addition I+J and the command for obtaining an absolute value. The result of addition L is expressed as follows.

$$L=I+J=C+(A-B)=C+|A-B|$$

In other words, the operation for adding the absolute value of the difference A-B to the value C is executed by the adder-subtracter 14 irrespective of the flag signal F.

According to the SPE 105b shown in FIG. 8 described above, the operation rules of the adder-subtracter 14 are changed in response to the flag signal F so that the absolute value of the difference A-B can be obtained. It is needless to say that a data signal whose absolute value should be obtained is not limited to the difference A-B.

Figure 9:
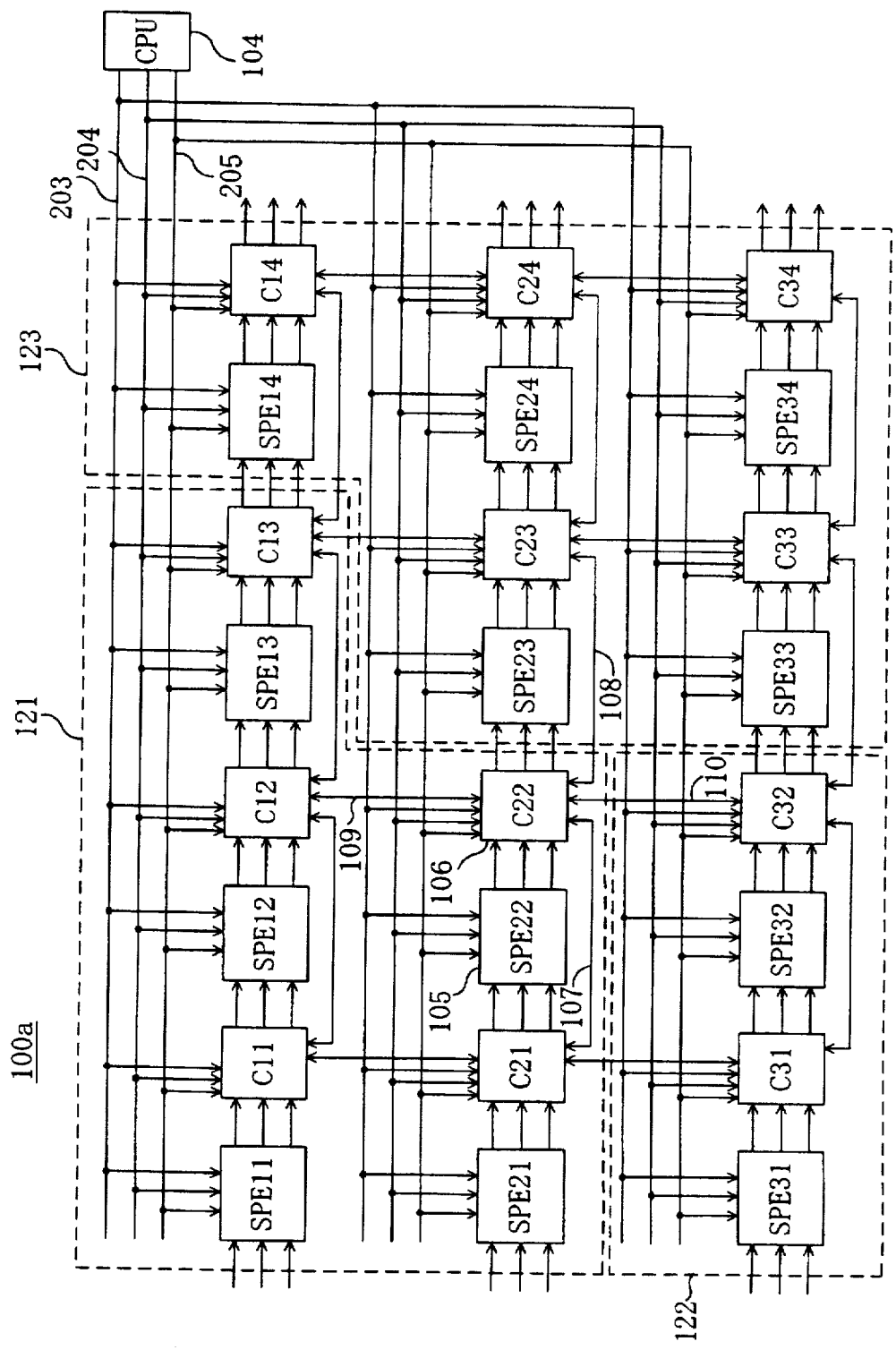
FIG. 9 is a block diagram showing another example of the connection of the signal processing elements in FIG. 1.

FIG. 9 shows another example of the connection of SPEs in FIG. 1. A signal processor 100a shown in FIG. 9 comprises a central processing unit (CPU) 104, twelve SPEs 105 which are arranged in a two-dimensional array having three rows and four columns, i.e., SPE11, SPE12, SPE13, SPE14, SPE21, SPE22, SPE23, SPE24, SPE31, SPE32, SPE33 and SPE34, twelve connecting circuits 106, i.e., C11, C12, C13, C14, C21, C22, C23, C24, C31, C32, C33 and C34. For example, C22 is provided between SPE22 and SPE23. Bypasses 107, 108, 109 and 110 are provided between C21 and C22, between C22 and C23, between C12 and C22, and between C22 and C32. Each of the connecting circuits 106 has a built-in control register for storing transfer control information which indicates a source and a destination of data. The CPU 104 writes data to the control registers of all the SPEs 105 and all the connecting circuits 106. For this reason, a data bus 203, an address bus 204 and a signal line 205 for transferring a write control signal are provided (see FIG. 3).

The signal processor 100a can freely set the processing which should be executed by each SPE 105. In addition, the signal processor 100a can send the output data signal of the SPE22 to the SPE13 and the SPE23, return the output data signal of the SPE22 to the SPE22, send the output data signal of the SPE22 to the SPE24 (skip the SPE23), and send the output data signal of the SPE14 to the SPE24. As shown in FIG. 9, the signal processor 100a can be divided into three portions 121, 122 and 123 each for executing different processing. The three kinds of SPEs 105, 105a and 105b may be provided in the signal processor 100a.

Figure 10:
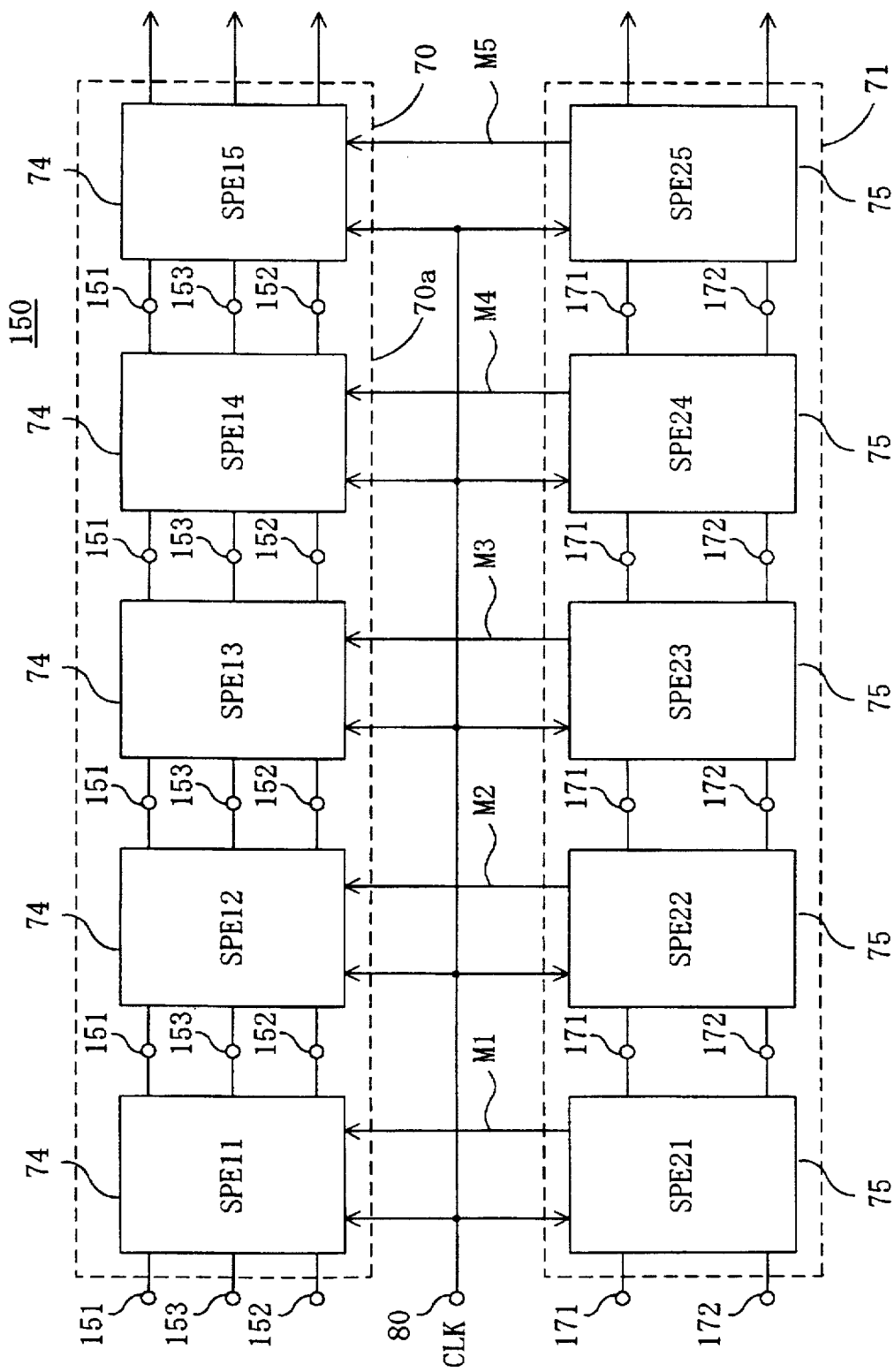
FIG. 10 is a block diagram showing another example of the structure of a signal processor according to the present invention.

FIG. 10 shows another example of the structure of the signal processor according to the present invention. In FIG.

10, a signal processor 150 comprises a mixing circuit 70 and a mixing control circuit 71. The mixing circuit 70 includes five signal processing elements (SPEs) 74 which are cascade-connected to each other. The signal processing elements 74 in first to fifth stages of the mixing circuit 70 will be hereinafter referred to as SPE11, SPE12, SPE13, SPE14 and SPE15. Each SPE of the mixing circuit 70 has a first input 151, a second input 152 and a third input 153. The mixing control circuit 71 includes five signal processing elements (SPEs) 75 which are cascade-connected to each other. The signal processing elements 75 in first to fifth stages of the mixing control circuit 71 will be hereinafter referred to as SPE21, SPE22, SPE23, SPE24 and SPE25. Each SPE of the mixing control circuit 71 has a fourth input 171 and a fifth input 172. A common clock signal CLK is sent to each SPE of the mixing circuit 70 and mixing control circuit 71 through a clock input 80. The SPE21 sends a 1-bit mixing rate signal M1 to the SPE11. The SPE22 sends a 1-bit mixing rate signal M2 to the SPE12. The SPE23 sends a 1-bit mixing rate signal M3 to the SPE13. The SPE24 sends a 1-bit mixing rate signal M4 to the SPE14. The SPE25 sends a 1-bit mixing rate signal M5 to the SPE15.

Figure 11:
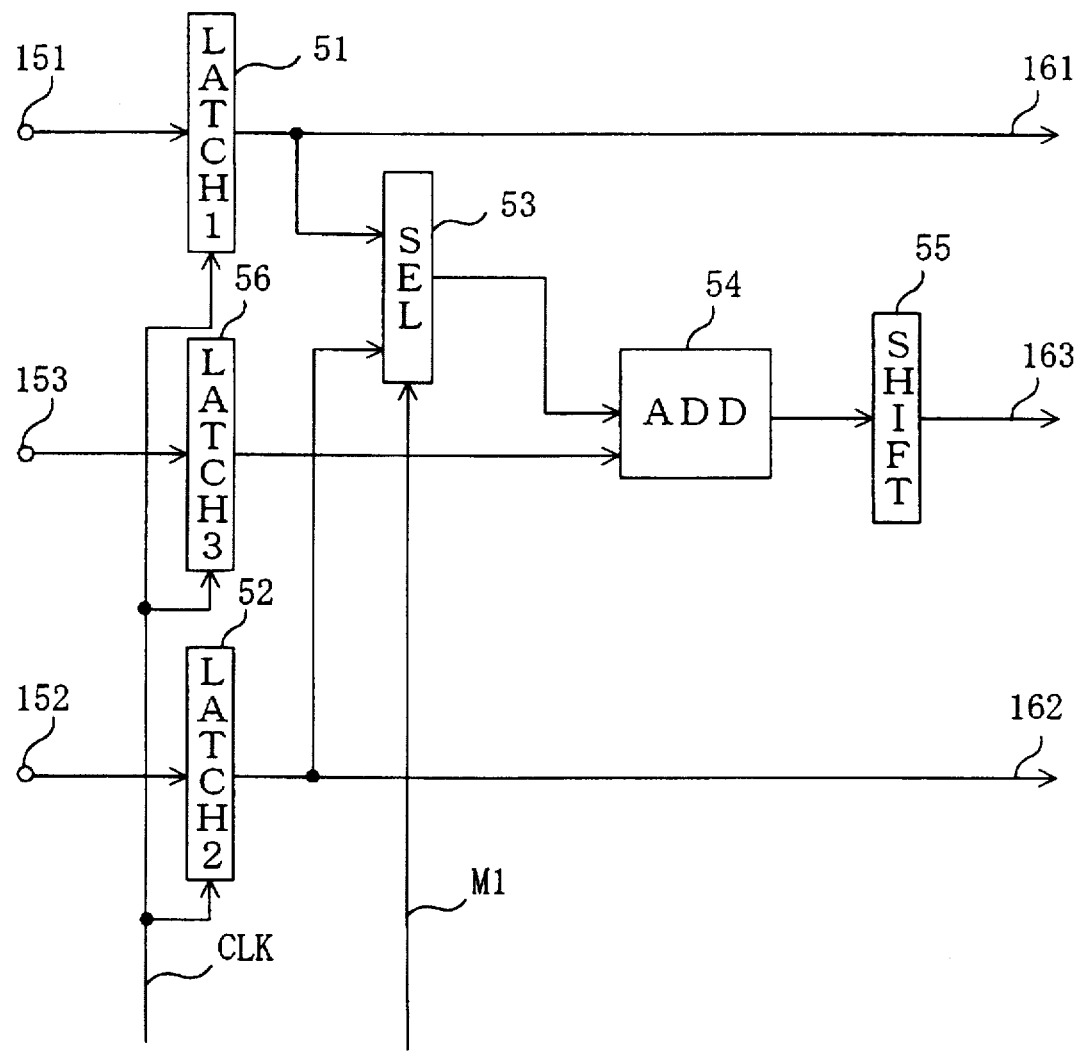
FIG. 11 is a block diagram showing the internal structure of a signal processing element in an upper element array in FIG. 10.

FIG. 11 shows the internal structure of the SPE11 in FIG. 10. The SPE11 comprises a first latch 51 for holding a data signal sent through the first input 151, a second latch 52 for holding a data signal sent through the second input 152, a third latch 56 for holding a data signal sent through the third input 153, a selecting circuit 53, an adder 54, and a shifter 55. A common clock signal CLK is sent to the first, second and third latches 51, 52 and 56. A data signal held by the first latch 51 is sent to the selecting circuit 53 and sent to the first input 151 of the SPE12 through a first output 161. A data signal held by the second latch 52 is sent to the selecting circuit 53 and sent to the second input 152 of the SPE12 through a second output 162. The selecting circuit 53 selects either a data signal sent from the first latch 51 or a data signal sent from the second latch 52 in response to the 1-bit mixing rate signal (selection signal) M1. More specifically, the selecting circuit 53 of the SPE11 outputs the data signal sent from the first latch 51 to the adder 54 if M1=1, and outputs the data signal sent from the second latch 52 to the adder 54 if M1=0. The adder 54 outputs, to the shifter 55, a data signal which indicates the sum of the data signal sent from the selecting circuit 53 and the data signal sent from the third latch 56. The shifter 55 outputs a data signal which is obtained by performing 1-bit left shift processing on the data signal sent from the adder 54. The output data signal of the shifter 55 is sent to the third input 153 of the SPE12 through a third output 163. The adder 54 also has the function of outputting the data signal sent from the third latch 56 to the shifter 55. The shifter 55 also has the function of outputting the data signal sent from the adder 54. The internal structures of the SPE12, SPE13, SPE14 and SPE15 are the same as in FIG. 11.

FIG. 12 shows the internal structure of the SPE21 in FIG. 10. The SPE21 comprises a fourth latch 60 for holding a data signal sent through a fourth input 171, a fifth latch 61 for holding a data signal sent through a fifth input 172, a control shifter 62, a subtracter 66, a result selecting circuit 67, and a flag holding circuit 69. The fourth and fifth latches 60 and 61 and the flag holding circuit 69 input a common clock signal CLK. A data signal held by the fourth latch 60 is sent to the control shifter 62, and sent to the fourth input 171 of the SPE22 through a fourth output 181. The control shifter 62 sends, to the subtracter 66, a data signal which is obtained by performing a specified amount of shift processing on a data signal output from the fourth latch 60. A data signal held by the fifth latch 61 is sent to the subtracter 66 and the result selecting circuit 67. The subtracter 66 subtracts a data signal which indicates the result of the shift processing performed by the control shifter 62 from the data signal sent from the fifth latch 61, and sends a flag signal S which indicates the sign of the result of subtraction together with a data signal which indicates the result of the subtraction T. If T<0, then S=0. If T≧0, then S=1. The result selecting circuit 67 sends, to the fifth input 172 of the SPE22 through a fifth output 182, a data signal which indicates the result of subtraction T of the subtracter 66 if S=1, and the data signal sent from the fifth latch 61 if S=0. The flag holding circuit 69 holds the flag signal S sent from the subtracter 66, and outputs the held flag signal S as a 1-bit mixing rate signal M1 to the SPE11. The internal structures of the SPE22, SPE23, SPE24 and SPE25 are the same as in FIG. 12.

The operation of the mixing circuit 70 will be described below. Data signals A, B and O are sent to the first, second and third inputs 151, 152 and 153 of the SPE11 respectively. The data signal A indicates the result of image-with-movement processing. The data signal B indicates the result of image-without-movement processing. The data signal O indicates a constant 0. It is assumed that the shifters 55 of the SPE11, SPE12 and SPE13 execute 1-bit left shift processing and that the shifters 55 of the SPE14 and SPE15 do not execute shift processing. An output MX of the shifter 55 of the SPE15 and an amount of image movement K are expressed as follows.

$$MX = K \times A + (16-K) \times B$$

$$K = M1 \times 8 + M2 \times 4 + M3 \times 2 + M4 \times 1 + M5$$

In other words, data signals A and B can be mixed in 17 stages according to a 5-bit mixing rate M1M2M3M4M5.

Assuming that the shifters 55 of the SPE11, SPE12, SPE13, SPE14 and SPE15 do not execute shift processing and that the adder 54 of the SPE15 sends the output of the third latch 56 to the shifter 55, the output MX of the shifter 55 of the SPE15 and the amount of image movement K are expressed as follows.

$$MX = K \times A + (4-K) \times B$$

$$K = M1 + M2 + M3 + M4$$

In other words, the data signals A and B can be mixed in 5 stages according to a 4-bit mixing rate M1M2M3M4.

As described above, the mixing circuit 70 can execute various kinds of mixing processing without using a multiplication circuit having a complicated structure. In addition, each SPE can execute pipeline operation so that the result of the mixing processing can be obtained every cycle. The third latch 56 and adder 54 of the SPE11 can be omitted.

The operation of the mixing control circuit 71 will be described below. Data signals D and C are sent to the fourth and fifth inputs 171 and 172 of the SPE21 respectively. The data signal C indicates an inter-frame difference, and the data signal D indicates an amount of edge. The control shifter 62 of the SPE21 executes 1-bit right shift processing. The control shifter 62 of the SPE22 executes 2-bit right shift processing. The control shifter 62 of the SPE23 executes 3-bit right shift processing. The control shifter 62 of the SPE24 executes 4-bit right shift processing. The control shifter 62 of the SPE25 executes 4-bit right shift processing. Consequently, the mixing control circuit 71 executes division C/D according to the algorithm shown in FIG. 4. In other words, the 5-bit mixing rate M1M2M3M4M5 indicates a quotient C/D. If C/D≧1, then M1=M2=M3=M4=M5=1. If C/D<1, then M1M2M3M4=16×C/D and M5=0.

If the data signal C is shifted left by 4 bits in advance, the control shifters 62 of the SPE21, SPE22 and SPE23 execute 3-bit left shift processing, 2-bit left shift processing and 1-bit left shift processing respectively and the control shifters 62 of the SPE24 and SPE25 do not execute shift processing. Thus, the same result as in the above description can be obtained.

As described above, the mixing control circuit 71 can execute division by using neither the ROM nor the multiplication circuit having a complicated structure. In addition, each SPE can perform pipeline operation.

FIG. 13 shows yet another example of the structure of the signal processor according to the present invention. In FIG. 13, a signal processor 150a comprises a mixing circuit 70a and a mixing control circuit 71a. The mixing circuit 70a includes four signal processing elements (SPEs) 74 which are cascade-connected to each other, i.e., SPE11, SPE12, SPE13 and SPE14. The internal structure of each SPE of the mixing circuit 70a is shown in FIG. 11. The mixing control circuit 71a includes four signal processing elements (SPEs) 75a which are cascade-connected to each other, i.e., SPE21, SPE22, SPE23 and SPE24. Each SPE of the mixing control circuit 71a has a fourth input 173. A common clock signal CLK is sent to each SPE of the mixing circuit 70a and mixing control circuit 71a through a clock input 80. The SPE21 sends a 1-bit mixing rate signal M1 to the SPE11. The SPE22 sends a 1-bit mixing rate signal M2 to the SPE12. The SPE23 sends a 1-bit mixing rate signal M3 to the SPE13. The SPE24 sends a 1-bit mixing rate signal M4 to the SPE14.

FIG. 14 shows the internal structure of the SPE21 in FIG. 13. The SPE21 comprises a fourth latch 81 for holding a data signal Z sent through a fourth input 173, a constant holding circuit 82 for holding a constant data signal Z1, a comparator 83 and a flag holding circuit 84. A common clock signal CLK is sent to the fourth latch 81 and the flag holding circuit 84. A data signal Z held by the fourth latch 81 is sent to the comparator 83 and to the fourth input 173 of the SPE22 through a fourth output 183. The constant holding circuit 82 sends a constant data signal Z1 to the comparator 83. The comparator 83 subtracts the data signal Z1 of the constant holding circuit 82 from the data signal Z of the fourth latch 81, and sends a flag signal S which indicates the sign of the result of subtraction. If the result of the subtraction is negative, then S=0. If the result of the subtraction is positive or 0, then S=1. The flag holding circuit 84 holds the flag signal S sent from the comparator 83, and output the held flag signal S as a 1-bit mixing rate signal M1 to the SPE11. In other words, if Z<Z1, then M1=0, and if Z≧Z1, then M1=1. The internal structures of the SPE22, SPE23 and SPE24 are the same as in FIG. 14. The constant holding circuits 82 of the SPE22, SPE23 and SPE24 hold constant data signals Z2, Z3 and Z4 respectively, wherein Z1>Z2>Z3>Z4.

FIG. 15 shows the operation of the mixing control circuit 71a. If Z1≦Z≦Zmax (Zmax is a maximum value of Z, for example, 1111), then M1M2M3M4=1111. If Z2≦Z≦Z1, then M1M2M3M4=0111. If Z3≦Z<Z2, then M1M2M3M4=0011. If Z4≦Z<Z3, then M1M2M3M4=0001. If 0≦Z<Z4, then M1M2M3M4=0000. Consequently, the signal processor 150a can mix data signals A and B in 5 stages according to a 4-bit mixing rate M1M2M3M4 and each SPE can perform pipeline operation. Since the operation of the mixing circuit 70a is the same as that of the mixing circuit 70 shown in FIG. 10, the description has been omitted.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

We claim:

1. A signal processor having a plurality of processing elements, said plurality of processing elements being connected in cascade so as to form a first path for transferring an input data signal of said signal processor, and second and third paths each for transferring a data signal indicative of a processing result of said input data signal, each of said plurality of processing elements comprising:

a first input disposed on said first path for providing a first data signal;

a second input disposed on said second path for providing a second data signal;

a third input disposed on said third path for providing a third data signal;

a data holding circuit for holding said first data signal provided from said first input, and for providing the first data signal thus held;

an arithmetic circuit for obtaining an operation result of addition-and-subtraction of said first data signal provided from said data holding circuit and said second data signal provided from said second input, for transferring a data signal which indicates the operation result thus obtained to said second path, and for providing a flag signal which indicates a sign of the operation result thus obtained;

an output selecting circuit for transferring, to said first path, either one of said first data signal provided from said data holding circuit and said data signal provided from said arithmetic circuit;

a flag holding circuit for merging said flag signal provided from said arithmetic circuit to said third data signal provided from said third input, for holding a merged flag signal thus obtained, and for transferring the merged flag signal thus held to said third path; and a processing control circuit for controlling respective operations of said data holding circuit, said arithmetic circuit, said output selecting circuit and said flag holding circuit, said arithmetic circuit comprising:

an input shifter for performing a specified amount of shift processing on said first data signal provided from said data holding circuit, and for providing a data signal which indicates a result of the shift processing thus performed;

an adder-subtracter for executing an addition-subtraction operation of said data signal provided from said input shifter and another data signal, and for providing a data signal which indicates an operation result of the addition-subtraction operation thus executed;

a result shifter for performing a specified amount of shift processing on said data signal provided from said adder-subtracter, and for providing a data signal which indicates a result of the-shift processing thus performed;

a result register for holding said data signal provided from said result shifter, and for providing the data signal thus held; and an input selecting circuit for providing, to said adder-subtracter, either one of said second data signal provided from said second input and said data signal provided from said result register.

2. The signal processor according to claim 1, wherein said data holding circuit comprises a plurality of latches for holding a plurality of data signals which form said first data signal provided from said first input, and for providing the plurality of data signals thus held, said output selecting circuit further has a function of transferring, to said first path, either one of said plurality of data signals provided from said plurality of latches, said arithmetic circuit further comprises a data selecting circuit for selecting at least one data signal from among said plurality of data signals provided from said plurality of latches, and said input shifter comprises at least one shifter for performing a specified amount of shift processing on said data signal provided from said data selecting circuit, and for providing a data signal which indicates a result of the shift processing thus performed to said adder-subtracter.

3. The signal processor according to claim 1, wherein said arithmetic circuit further comprises an input register for holding said second data signal provided from said second input, and for providing the second data signal thus held to said input selecting circuit.

4. The signal processor according to claim 1, wherein said arithmetic circuit further comprises a result selecting circuit for providing, to said result shifter, either one of said data signal provided from said input selecting circuit and said data signal provided from said adder-subtracter.

5. The signal processor according to claim 1, wherein said processing control circuit comprises at least one control register for holding control information which specifies respective operations of said data holding circuit, said arithmetic circuit, said output selecting circuit and said flag holding circuit.

6. The signal processor according to claim 1, further comprising an operation change control circuit for causing said adder-subtracter to execute subtraction when a command for addition is issued by said processing control circuit and to execute addition when a command for subtraction is issued by said processing control circuit when said third data signal provided from said third input indicates a negative sign.

* * * * *